United States Patent [19]
Gelbart

[11] Patent Number: 5,177,724
[45] Date of Patent: Jan. 5, 1993

[54] OPTICAL TAPE RECORDER USING A RESONANT FLEXURE SCANNER

[75] Inventor: Daniel Gelbart, Vancouver, Canada
[73] Assignee: Crea Products Inc., Burnaby, Canada
[21] Appl. No.: 772,902
[22] Filed: Oct. 8, 1991
[51] Int. Cl.⁵ .............................................. G11B 7/12
[52] U.S. Cl. .............................. 369/44.16; 369/44.37; 369/44.15
[58] Field of Search ............... 369/126, 130, 136, 125, 369/44.16, 44.37, 44.38, 99, 112, 44.15

[56] References Cited
U.S. PATENT DOCUMENTS
4,616,355 10/1986 Kasahara .......................... 369/44.16

Primary Examiner—Constantine Hannaher
Assistant Examiner—Don Wong

[57] ABSTRACT

An optical tape recorder uses a resonant flexure scanner to scan across the width of optical tape in a straight or nearly straightline. The use of flexure eliminates bearings in the scanner design and lowers cost. High data rate is achieved by using a multi-channel laser diode array for writing, imaged by a single moving lens mounted on the scanner. The use of a highly resonant scanner enables to interpolate the position of the lens by knowing the amplitude and frequency of the scanner. The flexing part of the scanner is a single flat spring or a combination of flat springs arranged to generate linear motion.

7 Claims, 2 Drawing Sheets

OPTICAL TAPE RECORDER USING A RESONANT FLEXURE SCANNER

This invention relates to optical data storage and more specifically to optical tape recorders. The purpose of the invention is to provide a scanner capable of high data density and high data rates when using optical tape without the use of bearings in the scanner. Scanner bearings increase the cost and lower the reliability of any scanner.

Existing scanners for optical tape recorders can be divided into two types: rotary and linear. Examples of rotary scanners are used in U.S. Pat. Nos. 4,661,941; 4,815,067; 4,807,213 and others. An example of a linear scanner is U.S. Pat. No. 4,567,585. Both types use bearings (either conventional or gas bearings). An example of a scanner not using bearings is the flexure scanner shown in U.S. Pat. No. 4,314,282 and also uses flexure galvanometers made by General Scanning (USA), which are well known to those versed in the art. Scanning galvanometer designs are not suitable for optical data storage applications due to the very large Numerical Aperture required in optical data storage devices. The system shown in U.S. Pat. No. 4,313,282 is not suitable since it achieves multi-channel writing by moving multiple lenses and light sources. This is only practical for wide formats such as printing engines, which is the object of U.S. Pat. No. 4,313,282.

It is the object of this invention to generate a scan across the tape without using scanner bearings. Another object is to make the scanner compatible with a multi-channel read/write head. Still a further object is to generate a high speed scanner capable of scan frequencies from 100 Hz to about 1000 Hz.

Two ways of carrying out the invention are described below with reference to the drawings in which.

Figure 1:
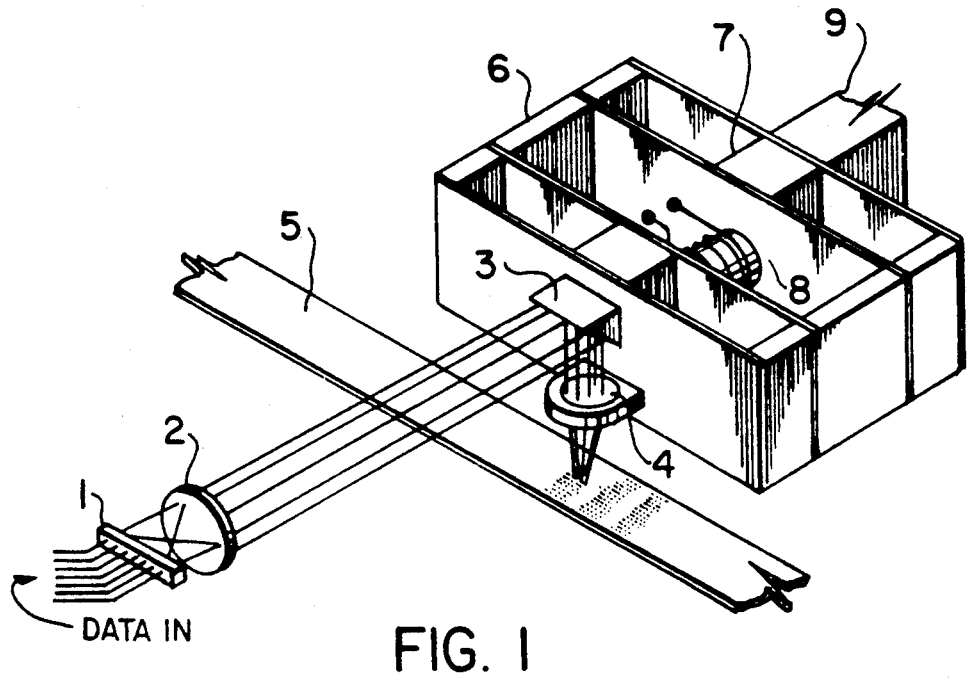
FIG. 1 is a perspective view of a scanner according with this invention generating a linear scan across the tape.

Referring now to FIG. 1, a laser diode array 1 is collimated by lens 2 into a nearly parallel beam impinging on mirror 3 and being reflected onto lens 4, forming a reduced image of array on optical tape 5. Mirror 3 and lens 4 are mounted on scanner 6 which uses flexure of flat springs to guide lens 4 in a straight line. The stationery part 7 of scanner 6 is rigidly held by the frame 9 of the recorder. The scanner is made to scan by the electromagnetic action of coil 8.

Figure 2A:
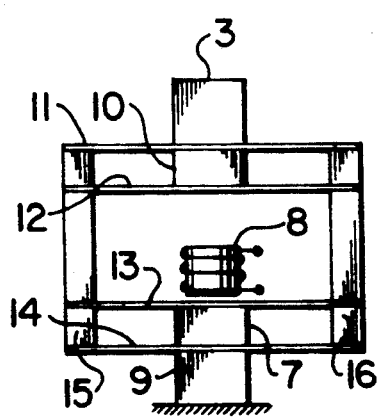
FIGS. 2a, 2b and 2c illustrate the principle of operation of the scanner shown in FIG. 1.
Figure 2B:
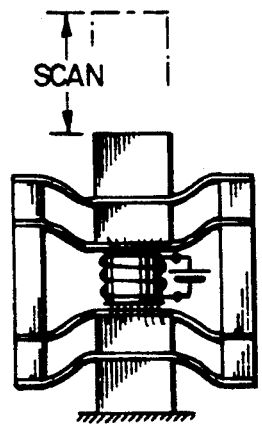
Figure 2C:
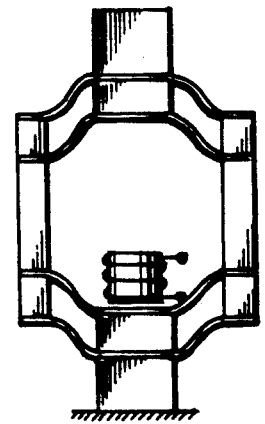

Referring now to FIG. 2a, showing the scanner in the stationary position, the scanner consists of four identical flat springs 11, 12, 13, 14 joined together at their ends by spacer bars 15, 16 to form a parallel spring arrangement. Two rigid blocks 7 and 10 serve as the mounting points. Block 7 is attached to the frame 9 of the recorder and is stationary. Block 10 carries the lens and mirror described earlier and is moving in a straight line as the flat springs flex. Blocks 7 and 10 are made of ferromagnetic material in order to be attracted by the magnetic field generated by passage of an electric current through coil 8. When energized by coil 8, preferably at the natural resonant frequency of the scanner, the moving block will move from the extreme position shown in FIG. 2b, through the neutral position of FIG. 2a to the other extreme shown in FIG. 2c. Construction details of the scanner follow standard practices in parallel spring mechanism design. For full construction details refer to the book "Instruments and Experiences" by R. V. Jones, pages 72-78 (John Wiley & Sons, 1988; ISBN 0471 91763X).

Figure 3:
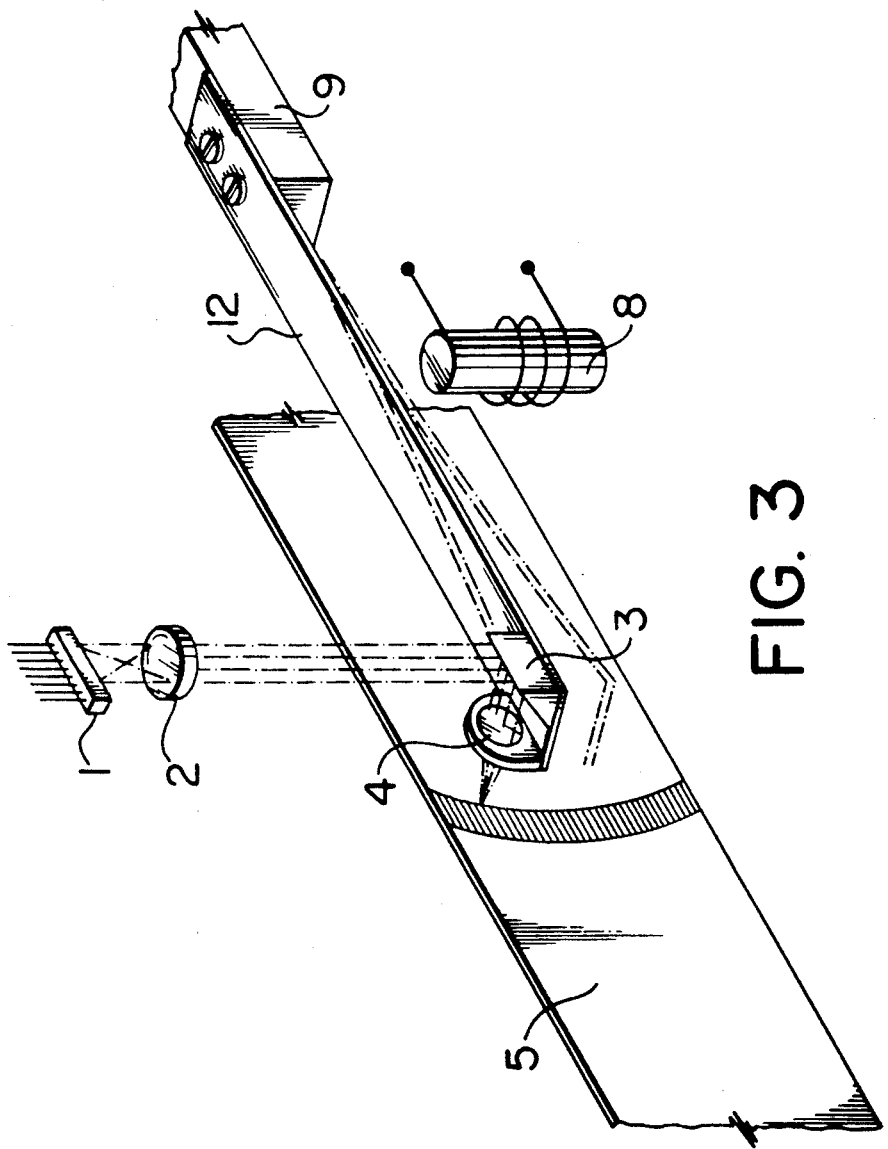
FIG. 3 is a perspective view of a simpler form of this invention generating a curved scan across the tape.

Laser diode array can be either a monolithic array, by the way of example following the design disclosed in U.S. Pat. No. 4,520,472, or an array of discrete laser diodes, as disclosed in U.S. Pat. No. 4,743,091. The overall sequence of operation of data recording is well known and need not be detailed here. Tape 5 will normally be housed in a cassette or cartridge and its motion is synchronized to the motion of the scanner 6 using similar method to those employed in magnetic recording. The advantage of the scanner design shown in FIG. 1 is that it generates an accurate linear motion without using bearings. If a slight curvature of motion can be tolerated the scanner shown in FIG. 3 is simpler and capable of faster scan rates. Referring now to FIG. 3, laser diode array 1 is collimated by lens 2, the nearly collimated beam is being reflected by mirror 3 onto lens 4 forming a reduced image of array 1 on optical tape 5. Elements 3 and 4 are mounted on a single flat spring 12 rigidly connected to frame 9 of the recorder. Flat spring 12 is driven at its resonant frequency by electromagnet 8. Flat spring 12 is made of (or contains) ferromagnetic material. As long as the deflection angle of the flat spring 12 is small, by the way of example under one degree of arc, the nearly collimated beam entering lens 4 will not be significantly displaced sideways by the flexing of flat spring 12. As before, the motion of tape 5 is synchronized to the motion of spring 12.

By the way of example optical tape 5 is made by ICI Imagedata (U.K.), is 8 mm wide and housed in a cassette. Spring 12 is about 300 mm long and its resonant frequency is about 250 Hz. The amplitude of the resonant flexing is controlled to be about 10 mm peak-to-peak. This gives deflection angles of below one degree to mirror 3 and lens 4. The deviation of the scan from a straight line in this case is less than 0.03 mm. This type of scanner is limited to about 10 mm of scan amplitude. In application where the width of the optical tape exceeds 8 mm, for example in 12.7 mm ("half-inch") cartridges the tape can be covered in two passes: half the width is scanned over the whole length of the tape, the tape moved relative to the scanner and the other half of the width scanned. The advantage of scanning half the tape width is that the tape returns to the beginning when the other half is scanned, thus not requiring rewinding.

Motion of optical tape 5 during scanning can be continuous or incremental (stepped). When motion is incremental it takes place when scanner is not over the active area of the tape. Incremental motion enables all records to be written parallel to each other. When motion of tape is continuous, consecutive records will not be parallel since the tape is advancing while the scanner is moving. This causes some loss of recording density. To overcome this problem the scanner can be designed that the trajectory of lens 4 is not a simple line or arc but a more complex shape, such as nearly triangular. This shape, when synchronized to tape motion, enables the (see pager 5) written records to be written parallel to each other in order to better utilize the tape area. One method of achieving a complex trajectory for lens 4 is to slightly vary the effective length of flat spring 12 during the scan by using magnetostriction. The use of magneto-striction to vary the length, and in particular use of highly magneto-strictive alloys such as Terfenol, is well known to those versed in the art.

What is claimed is:

1. An optical recorder for data storage comprising: an array of laser diodes modulated by incoming data;
   a material capable of being marked by the focused light of said laser diodes;
   a scanner using flexure to generate a scan parallel to the surface of said material and means of driving said scanner at its natural resonant frequency and at a constant amplitude;
   a mirror mounted on moving part of said scanner onto which light from said modulated laser diodes impinges;
   a lens mounted on moving part of said scanner to focus said light reflected from said mirror onto surface of said material, causing a permanent mark when any of said laser diodes are turned on and means of moving said material in a direction perpendicular to direction of movement of said scanner while synchronized to said scanner.

2. An optical recorder for data storage as set forth in claim 1 wherein said scanner comprises of flat springs arranged in a manner to move the said lens in a straight line parallel to said material.

3. An optical recorder for data storage as set forth in claim 1 wherein said scanner is moving said lens in an arc parallel to said material.

4. An optical recorder for data storage as set forth in claim 1 wherein said scanner includes a magneto-strictive element in order to modify the trajectory of said lens.

5. An optical recorder for data storage as set forth in claim 1 wherein said material is optical tape housed in a cartridge.

6. An optical recorder for data storage as set forth in claim 1 wherein said material is optical tape housed in a cassette.

7. An optical recorder for data storage as set forth in claim 1 wherein said material is an optical memory card.

* * * * *